United States Patent
Aher et al.

(10) Patent No.: US 12,197,969 B2
(45) Date of Patent: Jan. 14, 2025

(54) SYSTEMS AND METHODS TO IMPROVE NOTIFICATIONS WITH TEMPORAL CONTENT

(71) Applicant: Adeia Guides Inc., San Jose, CA (US)

(72) Inventors: Ankur Anil Aher, Maharashtra (IN); Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/121,985

(22) Filed: Mar. 15, 2023

(65) Prior Publication Data
US 2023/0214281 A1  Jul. 6, 2023

Related U.S. Application Data

(63) Continuation of application No. 17/383,062, filed on Jul. 22, 2021, now Pat. No. 11,630,710.

(51) Int. Cl.
| | |
|---|---|
| G06F 9/54 | (2006.01) |
| G06F 40/40 | (2020.01) |
| G06Q 10/1093 | (2023.01) |
| H04L 51/046 | (2022.01) |
| H04L 51/224 | (2022.01) |
| H04L 67/10 | (2022.01) |

(52) U.S. Cl.
CPC .............. *G06F 9/542* (2013.01); *G06F 40/40* (2020.01); *G06Q 10/1093* (2013.01); *H04L 51/046* (2013.01); *H04L 51/224* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 8,930,820 B1* | 1/2015 | Elwell | G09D 3/12 |
| | | | 715/963 |
| 10,431,188 B1 | 10/2019 | Nelson et al. | |
| 11,228,810 B1 | 1/2022 | Arazi | |
| 11,481,735 B1* | 10/2022 | Schemers | G06Q 10/1093 |
| 11,587,457 B1* | 2/2023 | Arazi | G06Q 10/109 |
| 11,630,710 B2 | 4/2023 | Aher et al. | |
| 2002/0002558 A1* | 1/2002 | Krause | G06Q 30/02 |
| 2005/0091184 A1 | 4/2005 | Seshadri et al. | |
| 2009/0153353 A1 | 6/2009 | Adams | |
| 2009/0320047 A1* | 12/2009 | Khan | G06F 9/542 |
| | | | 719/318 |

(Continued)

FOREIGN PATENT DOCUMENTS

| | | | | |
|---|---|---|---|---|
| KR | 101231461 B1 | 2/2013 | | |
| WO | WO-2022015864 A1 * | 1/2022 | .......... | G06F 11/3051 |

*Primary Examiner* — Phyllis A Book
(74) *Attorney, Agent, or Firm* — Haley Guiliano LLP

(57) ABSTRACT

Systems and methods for modifying a notification received on a user device are disclosed. The method comprises receiving from at least one application on a user device a notification, identifying temporal information associated with the notification, detecting based on the temporal information a calendar-related event from a user profile, and modifying the temporal information associated with the notification to refer to the calendar-related event.

14 Claims, 10 Drawing Sheets

(56) References Cited

U.S. PATENT DOCUMENTS

| | | | |
|---|---|---|---|
| 2013/0066866 A1* | 3/2013 | Chan | G06F 16/335 |
| | | | 707/732 |
| 2014/0052680 A1 | 2/2014 | Nitz et al. | |
| 2014/0280735 A1* | 9/2014 | Kalaboukis | G06Q 30/02 |
| | | | 709/217 |
| 2014/0282003 A1* | 9/2014 | Gruber | G06F 3/165 |
| | | | 715/727 |
| 2014/0351342 A1* | 11/2014 | Tseng | G06Q 30/00 |
| | | | 709/204 |
| 2016/0065630 A1* | 3/2016 | Gupta | G06Q 50/01 |
| | | | 709/204 |
| 2016/0203442 A1* | 7/2016 | Pererira | G06Q 10/1095 |
| | | | 705/7.19 |
| 2016/0342694 A1* | 11/2016 | Allen | H04L 67/535 |
| 2016/0358065 A1* | 12/2016 | Gedge | G06N 20/00 |
| 2017/0109390 A1* | 4/2017 | Bradley | G06F 16/335 |
| 2017/0118348 A1 | 4/2017 | Dotan-Cohen et al. | |
| 2019/0182346 A1* | 6/2019 | Jiang | G10L 25/48 |
| 2019/0370754 A1* | 12/2019 | Berget | G06F 3/0482 |
| 2019/0394289 A1* | 12/2019 | Lehrian | H04L 67/306 |
| 2020/0302264 A1* | 9/2020 | Fourney | G06F 3/0484 |
| 2021/0004770 A1 | 1/2021 | Bansal et al. | |
| 2023/0014775 A1* | 1/2023 | Dotan-Cohen | H04L 51/046 |
| 2023/0021597 A1 | 1/2023 | Aher et al. | |

* cited by examiner

SYSTEMS AND METHODS TO IMPROVE NOTIFICATIONS WITH TEMPORAL CONTENT

CROSS-REFERENCE TO RELATED APPLICATIONS

This application is a continuation of U.S. patent application Ser. No. 17/383,062, filed Jul. 22 2021, the disclosure of which is hereby incorporated by reference herein in its entirety.

BACKGROUND

The present disclosure relates to notifications from applications, and more particularly, to systems and methods for modifying notifications comprising temporal content.

SUMMARY

Notifications are used by systems and applications for various purposes such as, for example, advertising, reminders, event updates, information, messaging, emails, etc. Notifications are, generally, controlled by the applications providing the notifications to the user, typically via a device notification manager. Typically, the same notification is sent repeatedly over a period of time by an application until the notification is no longer relevant or valid, or is dismissed by the user. Many of these notifications are of the type that appeals to the user or reminds the user of some activity on a relevant day/date/time. Such notifications can be termed as notifications with temporal information, in particular, absolute temporal information.

Relative temporal information, around dates such as a birthday, an anniversary, a holiday event, a national holiday, a bank holiday, a religious event, a historical event, a user-saved date of interest, or the like is fairly easy for a user to remember. However, absolute temporal information is difficult to remember. For example, a notification that a user's favorite TV series returns at "3 pm on Tuesday 29 March" has no relative information and is difficult to remember for the user after a glance at a notification; however, a notification that the TV series will return at "3 pm on your birthday" is much easier for a user to remember. Accordingly, it would be beneficial to a user for a notification, which is provided with absolute temporal information, to be modified to comprise relative temporal information.

In a first approach, there is provided a method for modifying a notification, the method comprising receiving, from at least one application on a user device, a notification; identifying temporal information associated with the notification; detecting, based on the temporal information, a calendar-related event from a user profile; and modifying the temporal information associated with the notification to refer to the calendar-related event.

In some examples, the method further comprises determining a user preference from the user profile and modifying the temporal information associated with the notification based on the user preference.

In some examples, the user preference comprises a threshold time, and modifying the temporal information associated with the notification is in response to the temporal information associated with the notification being less than the threshold time.

In some examples, the method further comprises removing references to absolute temporal information.

In some examples, the method further comprises determining user-preferred vocabulary from the user profile, foe example, wherein the modifying further comprises referring to the calendar-related event with the user preferred vocabulary.

In some examples, the method further comprises determining, from the user profile, the calendar-related event is one of a birthday, an anniversary, a holiday event, a national holiday, a bank holiday, a religious event, a historical event, or a user-saved date of interest. In some examples, the method further comprises determining a context of the calendar-related event.

In some examples, the method further comprises assigning a weighted score to the calendar-related event based on the context of the calendar-related event. In some examples, when a positive weight score is assigned to the calendar-related event, the notifications are modified to a first degree of modification, and when a negative weight score is assigned to the calendar-related event, the notifications are modified to a second degree of modification, wherein the second degree of modification is lower than the first degree of modification.

In another approach, there is provided a media device, comprising a control module, a transceiver module, and a network module, configured to receive, from at least one application on a user device, a notification; identify temporal information associated with the notification; detect, based on the temporal information, a calendar-related event from a user profile; and modify the temporal information associated with the notification to refer to the calendar-related event.

In another approach, there is provided a system for modifying a notification, the system comprising: means for receiving, from at least one application on a user device, a notification; means for identifying temporal information associated with the notification; means for detecting, based on the temporal information, a calendar-related event from a user profile; means for modifying the temporal information associated with the notification to refer to the calendar-related event.

In another approach, there is provided a non-transitory, computer-readable medium having instructions encoded thereon for carrying out a method, the method comprising: receiving, from at least one application on a user device, a notification; identifying temporal information associated with the notification; detecting, based on the temporal information, a calendar-related event from a user profile; and modifying the temporal information associated with the notification to refer to the calendar-related event.

In another approach, there is provided a method for compiling associated notifications received on a user device, the method comprising: receiving, from an application on the user device, an occurrence of a first notification; monitoring user activity following the occurrence of the first notification; determining a set of one or more occurring notifications are associated with the first notification; determining temporal information of the first notification and the set of notifications; based on a comparison of the temporal information and the user activity, generating for display a second notification comprising the temporal information of the first notification and the set of notifications.

In some examples, the method further comprises determining a user preference from a user profile. In some examples, the method further comprises modifying the temporal information associated with the notification based on the user preference.

In some examples, the user preference comprises a threshold time. In some examples, the modifying the temporal information associated with the notification is in response to the temporal information associated with the notification being less than the threshold time. In some examples, the method further comprises removing references to absolute temporal information.

In some examples, the method further comprises determining an insertion point within a time threshold of the calendar-related event, receiving a user input to create a calendar event, and inserting the calendar event at the insertion point.

In another approach, there is provided a media device, comprising a control module, a transceiver module, and a network module, configured to receive, from an application on the user device, an occurrence of a first notification; monitor user activity following the occurrence of the first notification; determine a set of one or more previously occurring notifications that are associated with the first notification; determine temporal information of the first notification and the set of notifications; and based on a comparison of the temporal information and the user activity, generate for display a second notification comprising the temporal information of the first notification and the set of notifications.

In another approach, there is provided a system for compiling associated notifications received on a user device, the system comprising: means for receiving, from an application on the user device, an occurrence of a first notification; means for monitoring user activity following the occurrence of the first notification; means for determining a set of one or more previously occurring notifications that are associated with the first notification; means for determining temporal information of the first notification and the set of notifications; and based on a comparison of the temporal information and the user activity, means for generating for display a second notification comprising the temporal information of the first notification and the set of notifications.

In another approach, there is provided a non-transitory, computer-readable medium having instructions encoded thereon for carrying out a method, the method comprising: receiving, from an application on the user device, an occurrence of a first notification; monitoring user activity following the occurrence of the first notification; determining a set of one or more previously occurring notifications that are associated with the first notification; determining temporal information of the first notification and the set of notifications; and based on a comparison of the temporal information and the user activity, generating for display a second notification comprising the temporal information of the first notification and the set of notifications.

Advantages of the present disclosure allow for modifying notifications on a user device to remove absolute temporal information and add relative temporal information. In this way, the temporal information in the notification is easier for the user to remember.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Methods and systems are provided herein for modifying a notification and, in some examples, for compiling associated notifications received on a user device.

As described above, examples of notifications with temporal information include notifications that indicate a user's favorite TV series is returning, e.g., "Watch the upcoming episode of Game of Thrones' at 3 pm on Tuesday, 29 Mar. 2022." Other examples include notification of an event of interest to the user, such as a sale event, "Amazon Big Saving Days sale will go live on Sunday, May 12." Another example of a notification with temporal information could be a reminder to pay a bill, e.g., "The last day to pay your broadband bill is 22 May 2021. Pay on time to continue the service." In these examples, an application sends the same notification to the user's device repeatedly over a period of time until the notification is no longer relevant, or valid, or is dismissed by the user.

However, the current state of the art in providing notifications such as those above is problematic for a user. In particular, the point of such notification is to remind a user that an upcoming event is happening and provide the user with more information. The notifications often include absolute temporal information such as date/day/time information that is specific and difficult to remember accurately. Often, users attempt to remember such absolute temporal information but recall it incorrectly as a result of the overly detailed information contained within the notification.

In addition, typical notification processes do not take into consideration the user's preference on presentation of the temporal information. For example, the user may prefer to be notified of an event only within a certain time period before the event, or may wish to be informed of notifications only within the next seven days by the day of the week (e.g., "next Tuesday") rather than the specific date (e.g., "29$^{th}$ March")—although these events both represent the same date/day, the user may prefer one over another.

Furthermore, typical notification processes do not take advantage of any factors that can help a user to make the notification easier to remember or have more impact. The notification would be easier to recall, for example, if the notification took into account some other event or activity the user is doing around the time of the event (e.g., "Game of thrones will be back on TV after you return from your camping trip"). In this way, both the impact on the user and the content provider is increased; for example, the user remembers the event more easily, and the content provider will improve impact with the user for increased likelihood of user interaction or engagement.

Solutions and details for providing methods and systems of modifying notifications and compiling associated notifications on a user device will be discussed in more detail below.

Figure 1:
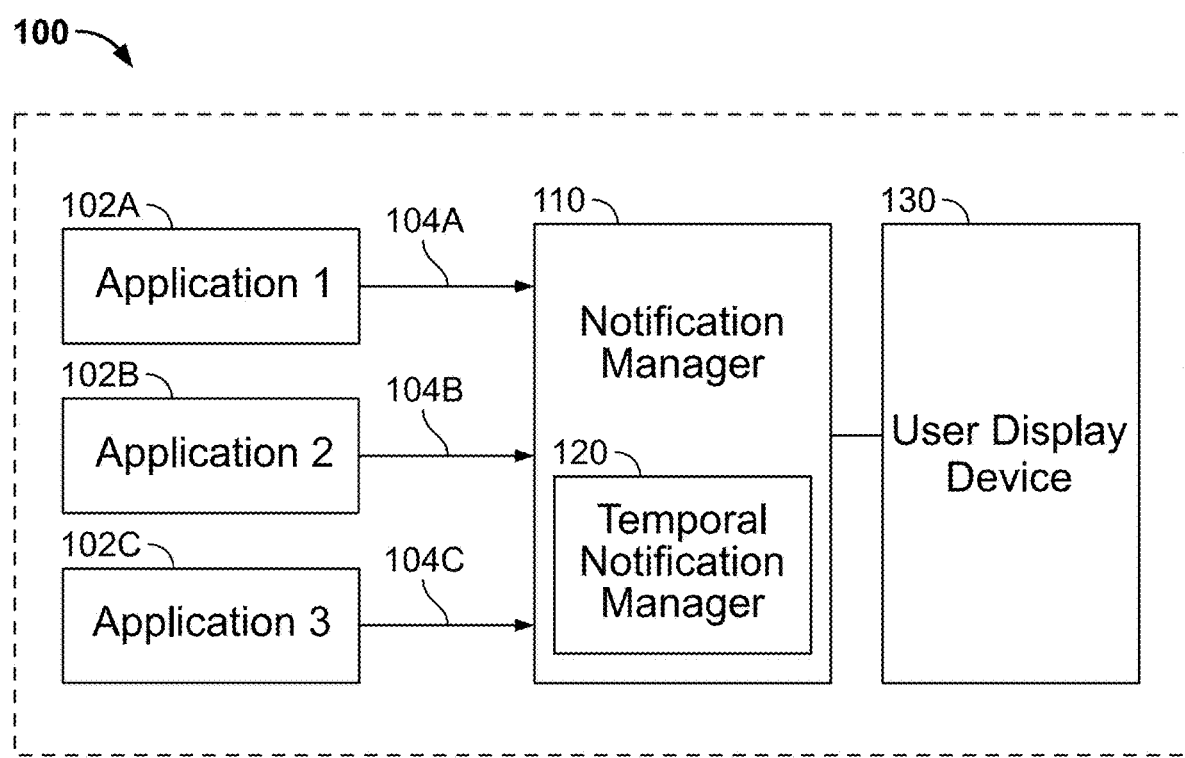
FIG. 1 illustrates a temporal notification manager receiving notifications from a plurality of applications, in accordance with embodiments of the present disclosure.

FIG. 1 illustrates a temporal notification manager receiving notifications from a plurality of applications, in accordance with embodiments of the present disclosure. Shown in FIG. 1 is a user device 100 comprising a plurality of applications 102A to 102C. Each application is communicatively coupled via a communication link 104A to 104C to the notification manager 110 of the user device. The notification manager comprises a temporal notification manager 120. The notification manager 110 is communicatively coupled to a user display device 130.

In some examples, the notification manager 110 receives notifications from the plurality of applications 102. The temporal notification manager 120 is a module or software-based system that takes the notification message from the "parent" notification manager 110 and identifies temporal information within the notification that indicates the trigger time of the event the notification is about.

The temporal notification manager 120 can access the user's calendar; for example the user's Google Calendar, Apple Calendar, Outlook calendar, or any kind of scheduler. In some examples, the user's calendar is located on the user device 100, and permission can be granted to the temporal notification manager 120 to access the calendar on the user's device. In some examples, the calendar is located off the user's device on a different platform. In this case, the calendar may be linked to a user profile, which can be accessed by the user device 100 when a notification is received. For example, the calendar could be hosted on a cloud platform. In some examples, the user may have two or more calendars or schedulers, therefore the temporal notification manager 120 may access an aggregated calendar from all different schedulers, or one or more of the calendars on the user device may comprise a calendar with aggregated calendar-related events, which enables the temporal manager to access the user's calendar-based events.

In some examples, the temporal notification manager 120 accesses the calendar-related events of the user regularly. For example, the temporal notification manager 120 may access the user's calendars or aggregated calendar daily, although any other suitable timeframe is considered to be included within the scope of the present disclosure, and store the calendar-rated events in memory (not shown). Accordingly, when notification manager 110 receives a notification from the applications 102A to 102C, the temporal notification manager can modify the notification without needing to access the calendars at that moment. In this way, should the user device not be able to access the calendars at the moment the notification is received, modification can still occur, as will be described in more detail below.

Some examples of typical calendar-related events include, but are not limited to, a birthday, an anniversary, a holiday event, a national holiday, a bank holiday, a religious event, a historical event, or a user-saved date of interest. In some examples, a context of the calendar-related events is determined. For example, a calendar-related event may be determined to be a personal event, such as a birthday, an anniversary of a wedding, an anniversary of a death, or a work anniversary. In another example, a calendar-related event may be determined to be a public event, such as a festival, technology meetup, or music concert. The context of the calendar-related events may also be determined to be positive or negative and assigned a weighted score based on the context. For example, a birthday may be assigned a positive weight score, and a death anniversary may be assigned a negative weight score. In some examples, calendar-related events that are happy events may be determined to be positive, and calendar-related that are sad may be determined to be negative.

In some examples, the notification manager 110 obtains calendar-related events from other sources such as emails, text messages, and other messaging platforms wherein the user organizes an event, such as going out for dinner with a friend. In some examples, the notification manager 110, which receives notifications that do not comprise temporal information too, can identify relevant temporal information from the plurality of other sources.

The modification of the temporal information is based on a plurality of variant templates that are mixed and combined to provide a greater plurality of combinations of modifying the temporal information of a notification. The generation of variants is driven by libraries contained within natural language processing technology that contains temporal variant templates.

In one variant, the current date and time are associated with the modification of the temporal information. For example, if the current day is Monday and the temporal information of the notification is in seven days, some of the candidates for this type of modification could refer to "next Monday," "seven days from now," "next week," "in a week," "the last Monday of the month," or the like.

In another variant, a calendar-related event is used as the reference day, rather than the current day or date, and is offset when compared to the temporal information in the notification. For example, if the temporal information of the notification is five days after the calendar-related event "Bob's birthday party," some of the candidates for this type of modification could refer to "five days after Bob's birthday party," or "the Monday after Bob's birthday party."

In another variant, a calendar-related event may be on the same day as the temporal information of a notification. Therefore, the temporal notification manager 120 can identify the time of the calendar-related event and modify the modification accordingly. For example, if the temporal information of the notification is the same day as the calendar-related event "Dinner with Joe," some of the candidates for this type of modification could refer to "before dinner with Joe tonight," or "after dinner with Joe," depending on whether it is determined that there is free time within the user's calendar before or after the calendar-related event.

In another variant, a notification 102 may be modified in a way that removes the temporal information in its entirety or obfuscates it. In some situations, a notification may comprise temporal information that expires after the notification being received and before the user views the notification. For example, if a notification recites, "'Game of Thrones' is on HBO at 8 pm" but the user doesn't look at their device until 8:05 pm, the notification can be modified to recite, "'Game of Thrones' is on HBO now." In this way, the temporal information is obfuscated and replaced.

In some examples, a positive weight score calendar-related event will be modified to a first degree of modification and a negative weight score calendar-related event will be modified to a second degree of modification. In some examples, the second degree of modification is lower than the first degree of modification, and the degree of modification is associated with the number of variants used in modifying the temporal information of the notification. In this way, the temporal notification manager 120 can avoid modifying inappropriate notifications on the user device 100. For example, a user may be happy to receive modified notifications about their birthday but unhappy to receive a modified notification regarding a death anniversary. In some examples, picking the most appropriate modification is a balance between randomness and the effectiveness of the assigned scores that are associated with each template of modification. Selecting randomly has the benefit of diversifying the delivery of temporal information to the user.

Figure 2:
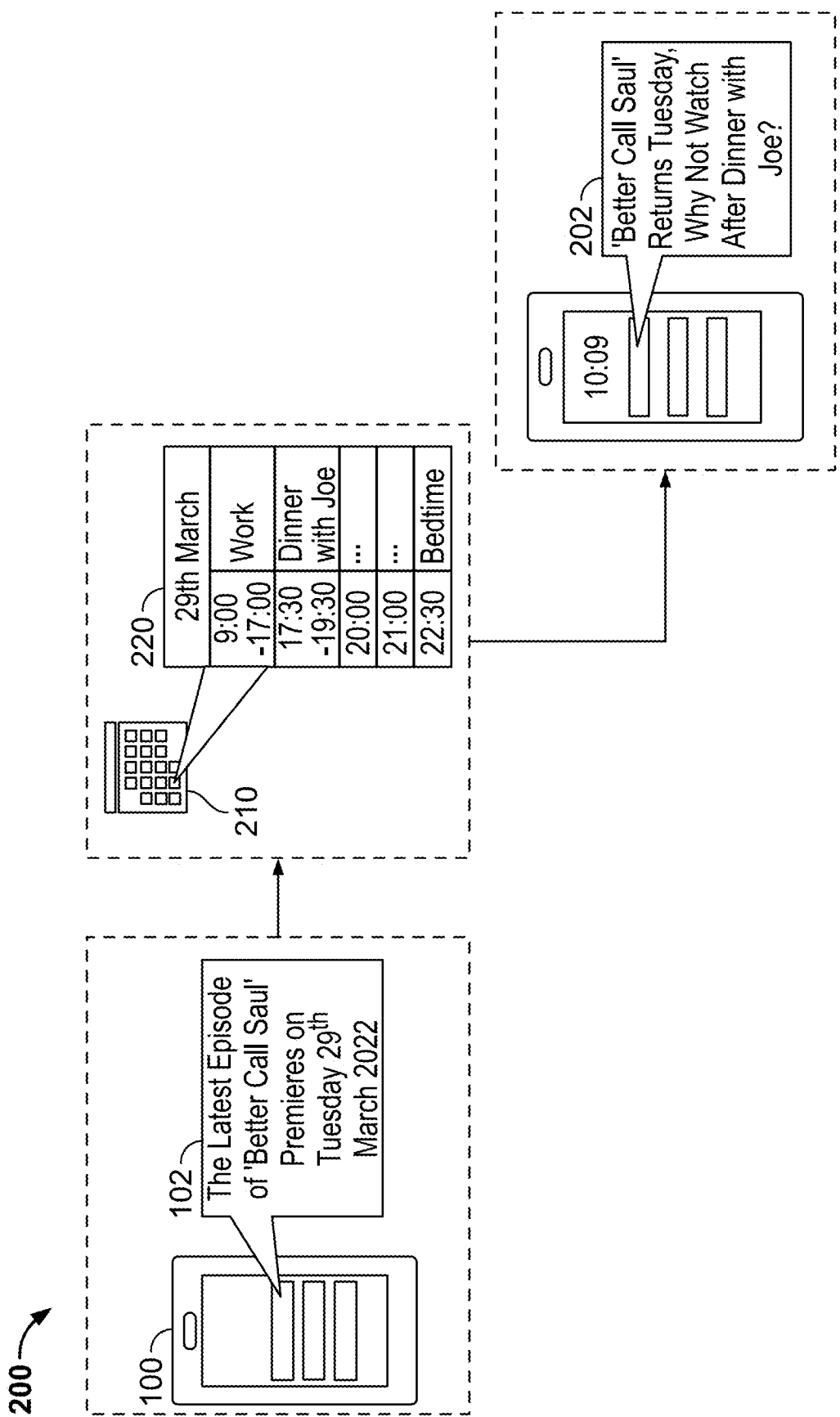
FIG. 2 illustrates an example scenario for modifying notifications, in accordance with some embodiments of the disclosure.

FIG. 2 illustrates an exemplary scenario for modifying notifications, in accordance with some embodiments of the disclosure. Consider scenario 200 in which a user (not shown) receives a notification 102 on user device 100. The application delivering the notification may not be present on the user device and may instead be present on a remote server that can communicate with the user device 100. The notification 102 is received by the notification manager 110 and comprises the message "The latest episode of 'Better Call Saul' premieres on Tuesday 29 Mar. 2022," as shown in FIG. 2. The temporal notification manager 120 determines, using natural language processing, that the notification is concerning the latest episode of the TV show "Better Call Saul" based on the keywords "latest episode," "premieres," and optionally looking up, in a knowledge base, the "Better Call Saul" title and finding this is a show on Netflix. The temporal notification manager 120 can determine the context as a positive as the user may have previously watched the earlier episodes or series, which will be stored within a user profile, such as a viewing history in the user's Netflix account.

Accordingly, the temporal notification manager 120 can interrogate the user's calendar 210 (or access the stored calendar information if this has been recently accessed and stored) within the user profile and detect a calendar-related event on or near the 29 Mar. 2022. Looking up the day view 220 of the calendar 210, the temporal notification manager 120 can identify that the user has an event called "Dinner with Joe" from 5:30 PM-7:30 PM and then no events thereafter. Therefore, the temporal notification manager 120 can modify the temporal information based on the calendar-related event and generate the modified notification 202 for display. For example, the modified notification 202 may recite "'Better Call Saul' returns Tuesday, why not watch after dinner with Joe?" In this way, the user is provided a modification notification comprising relative temporal information rather than absolute temporal information, which is easier for the user to remember. In addition, the advertisement has better engagement with the user.

In some examples, the temporal notification manager 120 can be configured with a threshold time to search around the temporal information contained within a notification. For example, if the threshold is set at one day, the temporal notification manager will search one day after and before the temporal information contained within a notification. Any time frame can be selected by the user for the threshold and stored within the user profile as a user preference.

Figure 3:
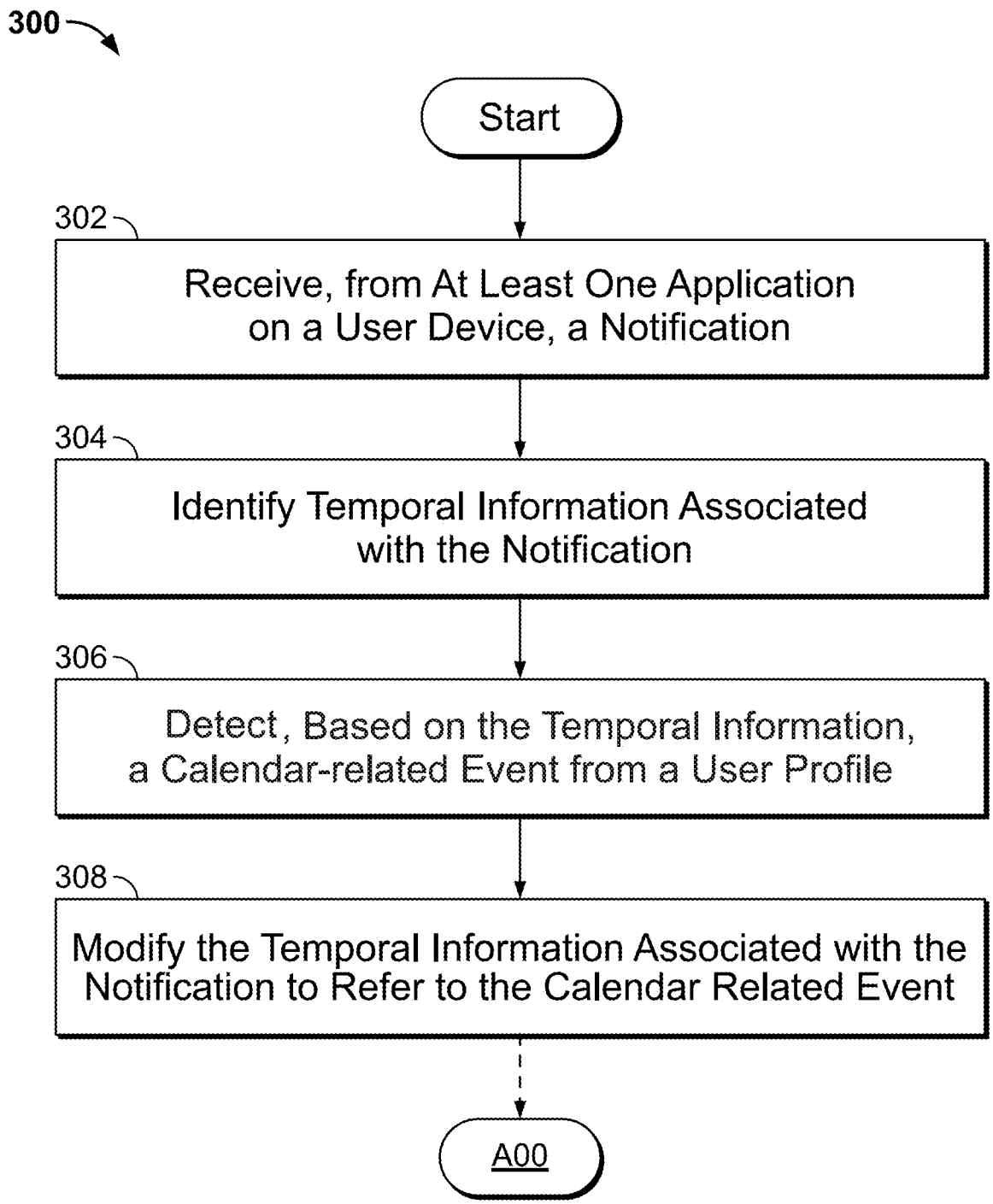
FIG. 3 illustrates an example flowchart of the processing involved in modifying notifications, in accordance with some embodiments of the disclosure.

FIG. 3 illustrates an exemplary flowchart of the processing involved in modifying a notification, in accordance with some embodiments of the disclosure. Process 300 starts at step 302. At step 302, a notification is received from at least one application on a user device. In some examples, the notification is received by a notification manager on the user's device. In some examples, the user device may be a smartphone, a laptop, PC, tablet, smartwatch or the like that receives a notification such as an advertisement for an upcoming sale through an application, SMS message, email, push notification from a server, messaging app, or the like. For example, the user device may receive a push notification from the Amazon Shopping App on the 15 May 2021 that states "Amazon big savings sale will go live on Friday, 21 May".

At step 304, temporal information associated with the notification is identified. A temporal notification manager 120 can identify the temporal information contained within a notification. For example, the previous example of a notification comprises temporal information, namely, the date "Friday $21^{st}$ May".

At step 306, a calendar-related event from a user profile is detected. For example, the user may have on their device or linked to their device via a user profile a calendar, or a scheduler, which contains events that the user is interested in. Alternatively, or in combination with accessing a calendar or scheduler, the user may have organized an event over email or text messages stored on the user device, which is harvested and stored in the user profile by an appropriate system on the user device. Temporal notification manager 120 can detect a calendar-related event from the user profile based on the temporal information in the notification. In the Amazon Shopping notification example, the temporal notification manager 120 can detect a calendar-related event just before, on, or just after Friday $21^{st}$ May, e.g., a trekking trip the user has organized with a friend on Saturday $22^{nd}$ May.

At step 308, the temporal information associated with the notification is modified to refer to the calendar-related event. Keeping with the Amazon Shopping notification example, the temporal manager 120 may modify the notification to recite, "Amazon big savings sale will go live the day before your trekking trip." In this way, the user is present with relative temporal information as opposed to the absolute temporal information originally provided in the notification.

Figure 4:
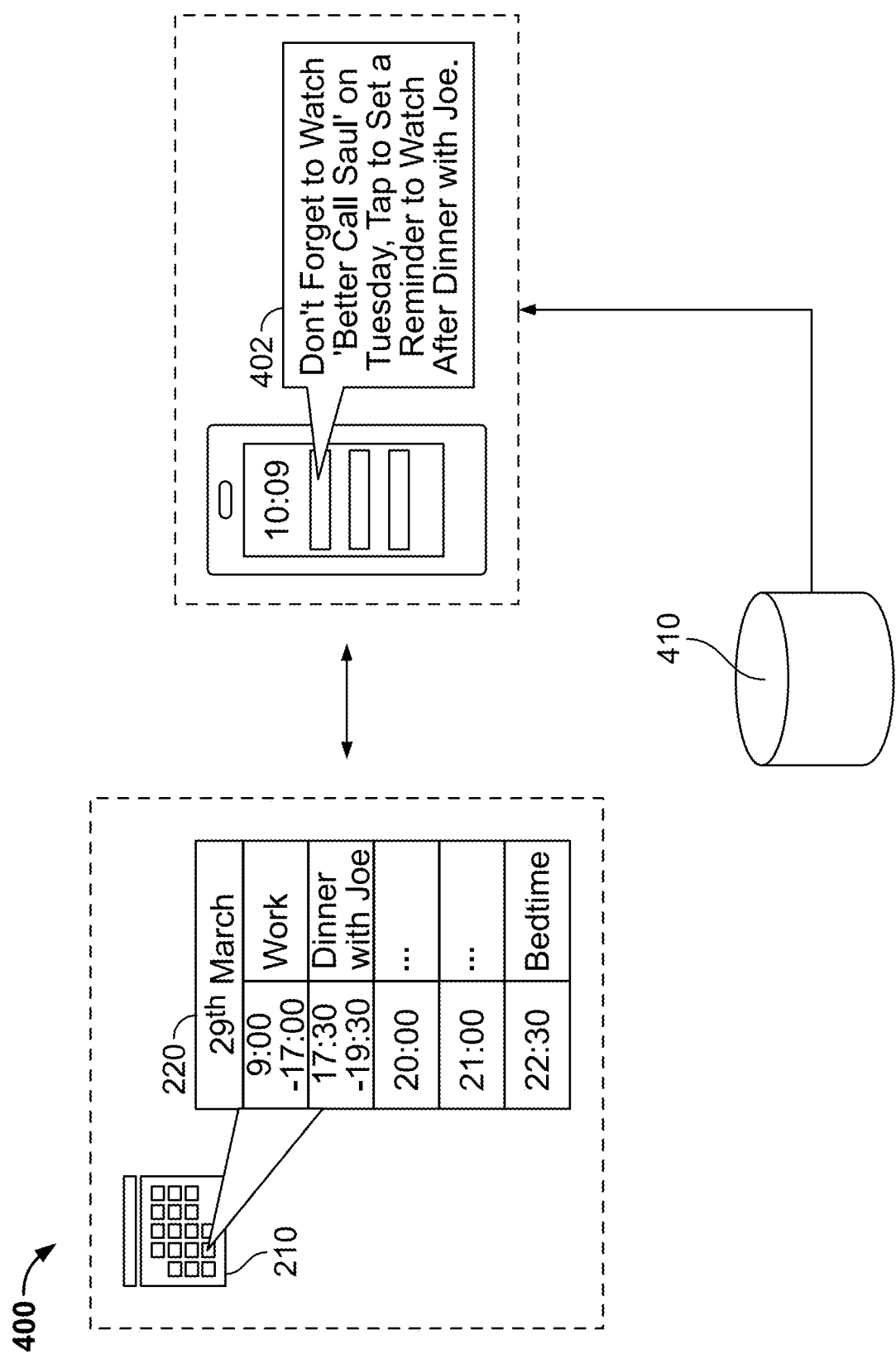
FIG. 4 illustrates an example scenario for modifying notification with user-preferred vocabulary, in accordance with some embodiments of the disclosure.

FIG. 4 illustrates an exemplary scenario for modifying a notification with user preferred vocabulary, in accordance with some embodiments of the disclosure. Scenario 400 is similar to scenario 200. The notification 102 is received by the notification manager 110 and comprises the message "The latest episode of 'Better Call Saul'" premieres on Tuesday 29 Mar. 2022, as shown in FIG. 2. Similar to scenario 200 in FIG. 2, the temporal notification manager 120 can interrogate the user's calendar 210 (or access the stored calendar information if this has been recently accessed and stored) within the user profile and detect a calendar-related event on or near the 29 Mar. 2022. Looking up the day view 220 of the calendar 210, the temporal notification manager 120 can identify that the user has an event called "Dinner with Joe" at 5:30 PM-7:30 PM and then no events thereafter.

However, in scenario 400, the user device 100 accesses a user profile stored on a databased 410 to determine user-preferred vocabulary for modifying the notification 102 into modified notification 402. As shown in FIG. 4, the notification has the phrases "Don't forget to watch" and "tap to set a reminder to watch after dinner with Joe," which the user profile indicates that the user prefers due to a previously assigned weighting on this vocabulary (determine by interaction, survey, or user selection, for example). Therefore, the temporal notification manager 120 can modify the temporal information based on the calendar-related event and generate the modified notification 402 for display. In this way, the user is provided a modification notification 402 comprising relative temporal information in accordance with a user preference.

In addition, as shown in the modified notification 402, the user has opted to be prompted to set a reminder by tapping the notification, which is discussed in more detail with regard to FIG. 7 below.

Figure 5:
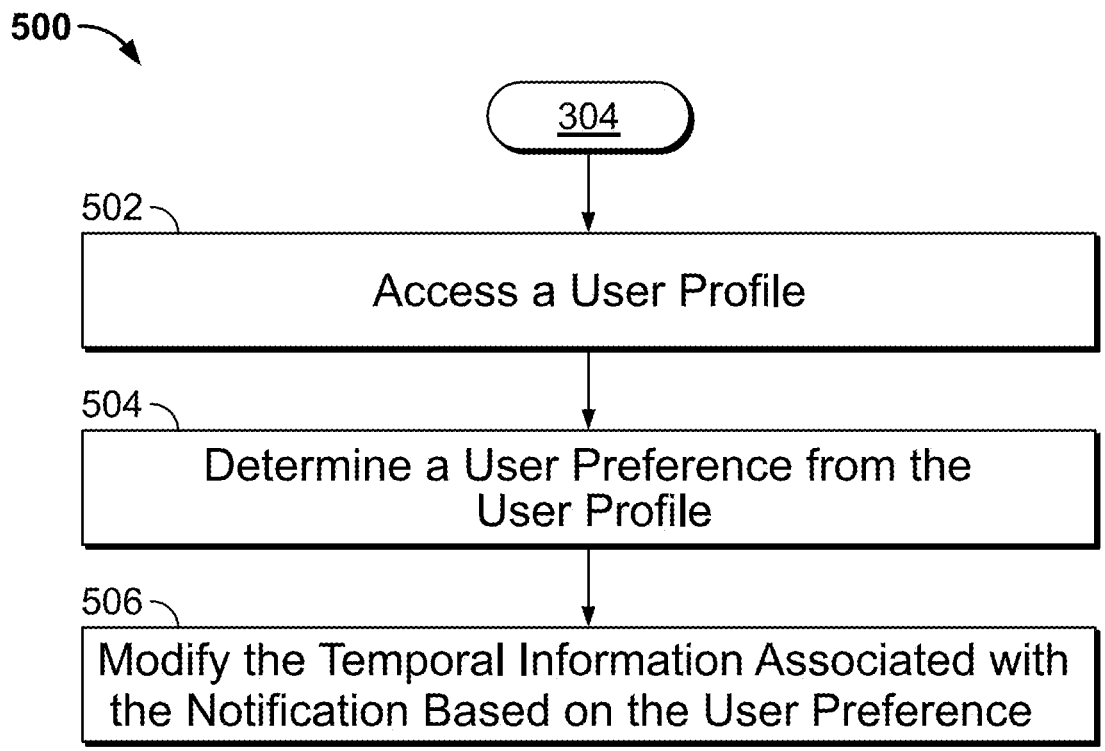
FIG. 5 illustrates an example flowchart of the processing involved in modifying a notification with a user preference from a user profile, in accordance with some embodiments of the disclosure.

FIG. 5 illustrates an exemplary flowchart of the processing involved in modifying a notification with a user preference from a user profile, in accordance with some embodiments of the disclosure. Process 500 starts at step 502. Step 502 may follow step 304 of process 300, however, process 500 may follow any other step in process 300 or may be performed in parallel to the steps in process 300. At step 502, a user profile is accessed. The user profile may be stored on the user device or stored within a database.

At 504, a user preference from the user profile is determined. At step 506, the temporal information associated with the notification is modified based on the user preference. The user preferences may provide information relative to how the user prefers to receive notifications. For example, the user may have a preference of which applications are permitted to have their notifications modified, the degree of modification of the notifications, permission for which calendars can be interrogated for calendar-related events, permission for which secondary applications (e.g., emails, text messages, social media platforms, other messaging applications) can be interrogated for calendar-related events, the time threshold for providing the relative temporal information, and preferences on which variants to use for generating the combinations of modified notifications.

Figure 6:
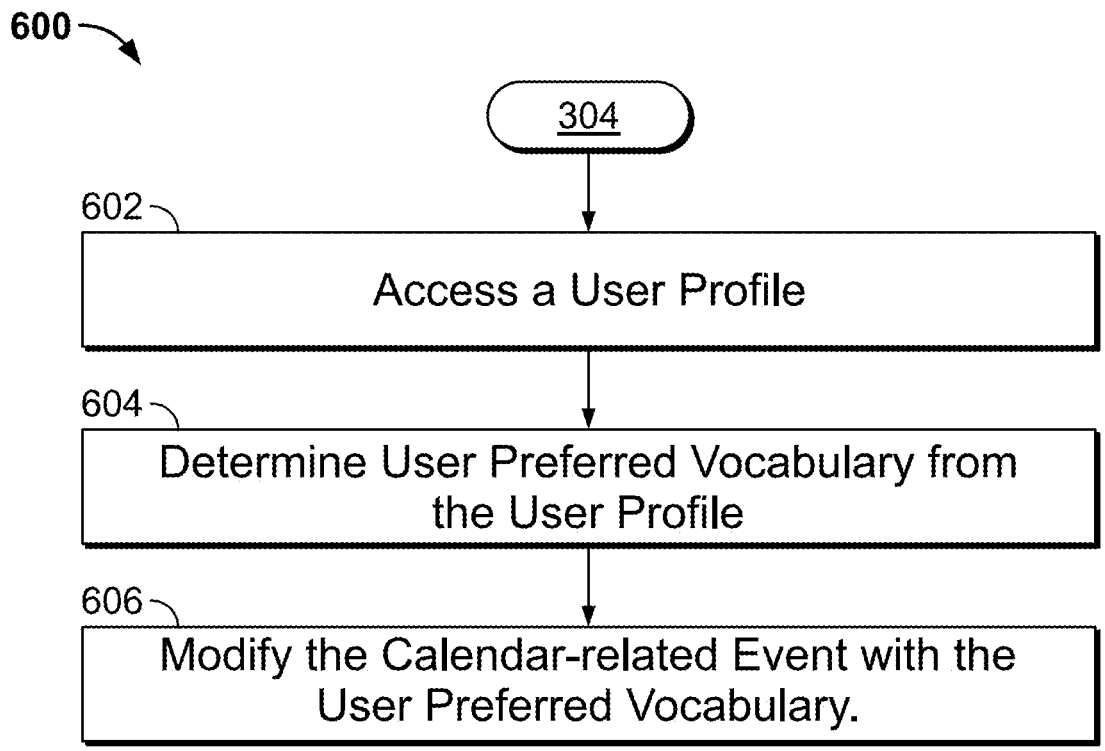
FIG. 6 illustrates an example flowchart of the processing involved in modifying a notification with user preferred vocabulary, in accordance with some embodiments of the disclosure.

FIG. 6 illustrates an exemplary flowchart of the processing involved in modifying a notification with user preferred vocabulary, in accordance with some embodiments of the disclosure. Process 600 is shown as following step 304 of process 300; however, process 600 may be performed after any of the steps in process 300 or process 500 or in parallel to any of the steps of process 300 or process 500. Process 600 starts at step 602, wherein a user profile is accessed.

At step 604, a user-preferred vocabulary is determined from the user profile. At step 606, the calendar-related event is modified with the user preferred vocabulary. For example, the temporal notification manager 120 can maintain/deduce the temporal vocabulary of a user by analyzing user activities, which include temporal assets such as the user setting a reminder for any event (e.g., "Set a reminder next Monday to watch 'Better Call Saul'"), the user booking appointments (e.g., "Book a dentist appointment on Sunday afternoon"), or the user querying the user device (e.g., "Which NBA team is playing on 20th of May?"). From the way the user interacts with the user device, digital assistants, messages, emails, and the like, the temporal notification manager 120 can learn the preferred user vocabulary. In some examples, when the temporal notification manager 120 determines preferred user vocabulary, the temporal notification manager can assign a positive weight score to the user vocabulary. If the user does not use vocabulary that is preconfigured in the temporal notification manager's 120 natural language processing libraries, then a negative weight score can be assigned to that vocabulary.

Figure 7:
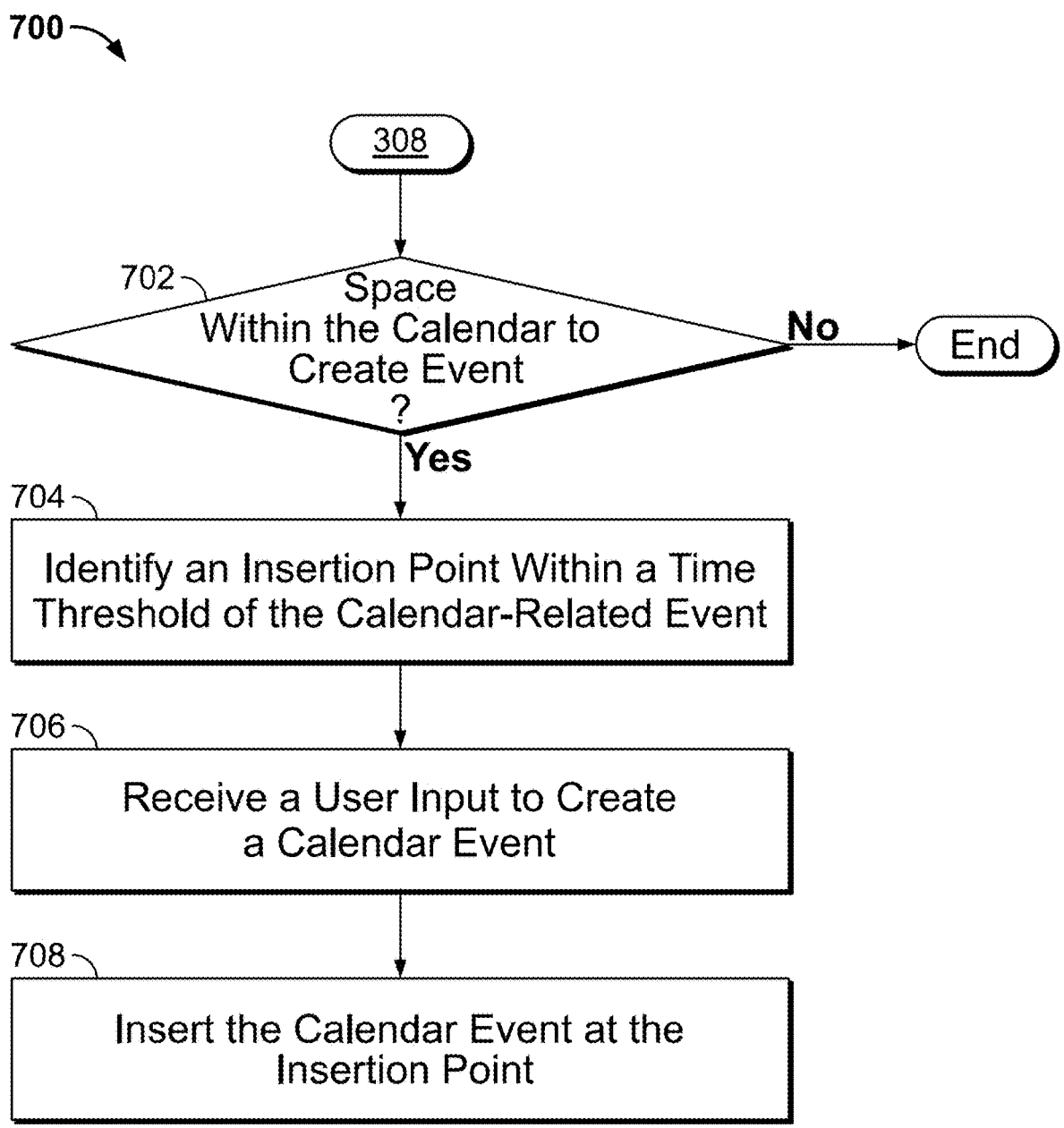
FIG. 7 illustrates an example flowchart of the processing involved in inserting a calendar event into a user's calendar in response to a user input, in accordance with some embodiments of the disclosure.

FIG. 7 illustrates an exemplary flowchart of the processing involved in inserting a calendar event into a user's calendar in response to user input, in accordance with some embodiments of the disclosure. Process 700 is shown as following step 308 of process 300, however, process 700 may be performed after any of the steps in process 300, 500, or 700, or in parallel to any of the steps of process 300, 500, or 600.

Process 700 starts at step 702, wherein it is determined whether or not there is space within the calendar to create an event. If the answer to step 702 is no, then process 700 ends. If the answer to step 702 is yes, then process 700 continues on to step 704.

At step 704, an insertion point within a time threshold of the calendar-related event of the notification 102 is identified. For example, the temporal notification manager 120 may identify that there is a free time entry at 8:00 PM and 9:00 PM, as shown in FIGS. 2 and 4. In some examples, the time threshold may be as little as 30 minutes on either side of the temporal information in the notification 102, up to a week on either side of the temporal information in the notification, or another user-preferred threshold as indicated in the user profile (as discussed above).

At step 706, a user input to create a calendar event is received. For example, after a notification has been modified, and comprises the language "tap here to set a reminder," the user may interact with the notification by tapping to set a reminder to watch a TV show, as shown in FIG. 4. At step 708, the calendar event is inserted at the identified insertion point. In some examples, in response to receiving the user input to create the calendar event, the temporal notification manager 120 can insert the calendar event at the insertion point identified in the calendar. For example, the user may tap the modified notification 402 to create a reminder to watch "Better Call Saul" after dinner with Joe, so the temporal notification manager can create the calendar event in the calendar of the user at a free slot in the calendar, such as 8:00 PM.

Figure 8:
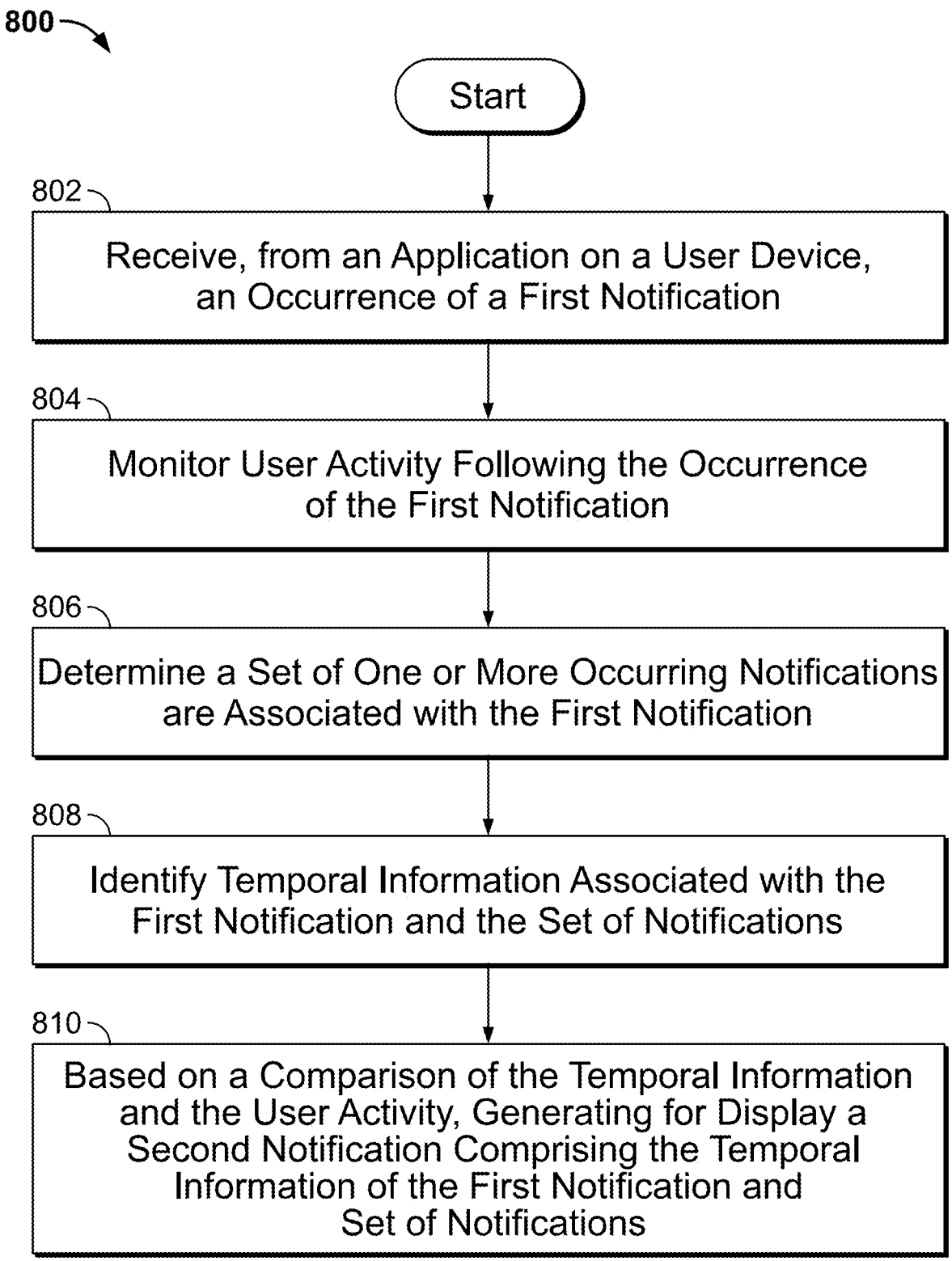
FIG. 8 illustrates an example flowchart of the processing involved in compiling associated notifications received on a user device, in accordance with some embodiments of the disclosure.

FIG. 8 illustrates an exemplary flowchart of the processing involved in compiling associated notifications received on a user device, in accordance with some embodiments of the disclosure. Process 800 may be performed after any of the steps in process 300, 500, or 700; or in parallel to any of the steps of process 300, 500, or 600.

At step 802, an occurrence of a first notification is received from an application on a user device, such as device 100.

At step 804, user activity following the occurrence of the first notification is monitored. For example, the user may receive a text message from a group chat, the user's interaction with the notification is monitored to determine if the user has seen the notification. If the user does not interact with the notification or open the text message, it can be assumed that the user has not seen the message, for example.

At step 806, it is determined that a set of one or more occurring notifications are associated with the first notification. The set of one or more occurring notifications may arrive after the first notification, or it may be determined that they arrived previously. For example, the user may continue to receive further text messages from the same group chat, and the notification manager 110 will continue to receive notifications from the messages application.

At step 808, temporal information associated with the first notification, and the set of one or more notifications is identified. For example, the user may receive a number of text messages from a group chat before the user sees any of the notifications. The user device may identify that 12 messages were received in five minutes from the timestamps of the notifications received from the messages application.

At step 810, based on a comparison of the temporal information and the user activity, a second notification comprising the temporal information of the first notification and set of notifications is generated for display. For example, it would be difficult for the user to read the 12 messages in the notification window of the user device 100; therefore, it would be more beneficial to consolidate all notifications into one notification that reads "You have received 12 messages from your group chat in the last five minutes," for example. In some examples, the consolidation of the notifications into a single notification may be in the form of generating for display a second notification comprising the temporal information associated with the first notification and set of one or more notifications. In other examples, the consolidation of the notifications into a single notification may be in the form of modifying the first notification to comprise the temporal information of the other notifications, the other notifications can then be removed from the notification window to prevent cluttering up the display of the user device.

Figure 9:
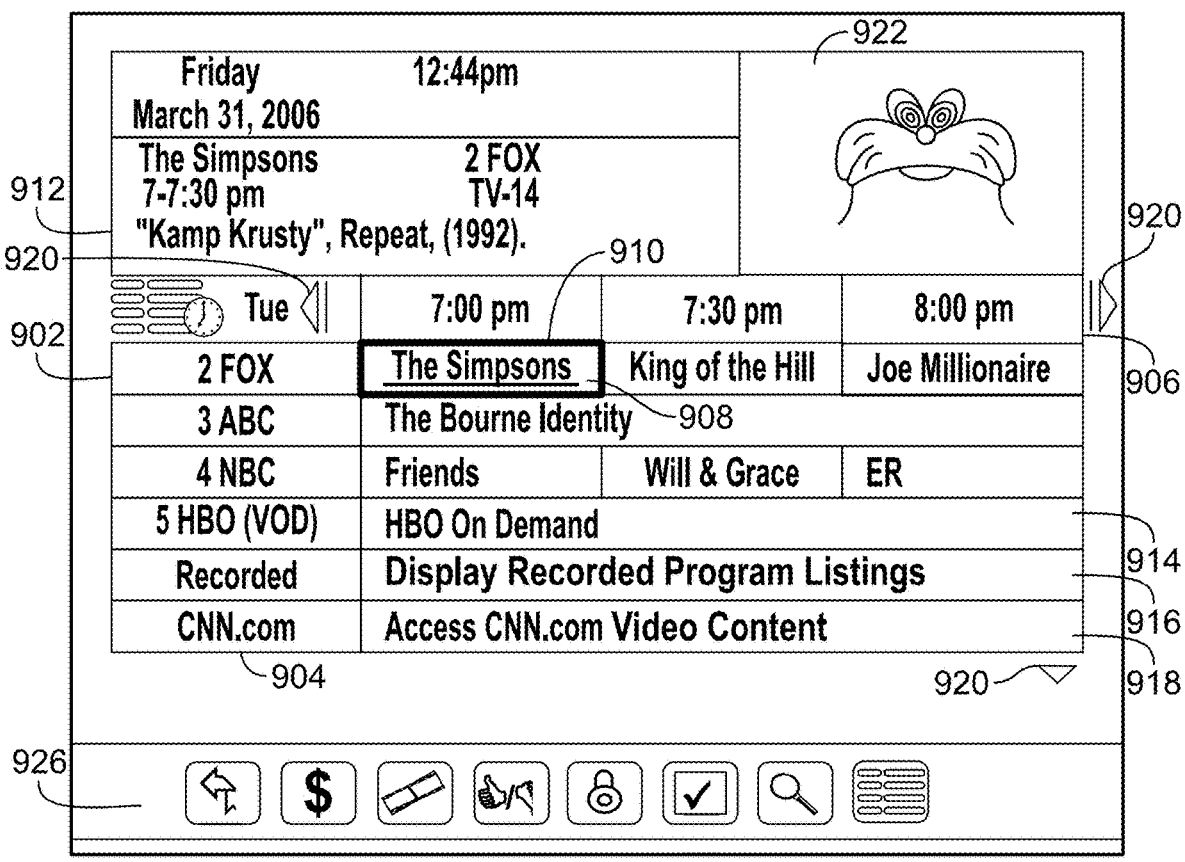
FIG. 9 illustrates an example grid of a program listings display arranged by time and channel from which a user may receive notifications, in accordance with some embodiments of the disclosure.

FIG. 9 shows an illustrative grid of program listings display 900 arranged by time and channel from which a user may receive notifications. The program listings display 900 may be provided by a set-top box. The set-top box may generate and transmit, in response to items contained within display 900, notifications for to the user device.

In more detail, display 900 may include grid 902 with: (1) a column of channel/content type identifiers 904, where each channel/content type identifier (which is a cell in the column) identifies a different channel or content type available; and (2) a row of time identifiers 906, where each time identifier (which is a cell in the row) identifies a time block of programming. Grid 902 also includes cells of program listings, such as program listing 908, where each listing provides the title of the program provided on the listing's associated channel and time. With a user input device, a user can select program listings by moving highlight region 910. Information relating to the program listing selected by highlight region 910 may be provided in program information region 912. Region 912 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media device also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage devices), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 902 may provide media guidance data for non-linear programming including on-demand listing 914, recorded content listing 916, and Internet content listing 918. A display combining media guidance data for content from different types of content sources is sometimes referred to as a "mixed-media" display. Various permutations of the types of media guidance data that may be displayed that are different than display 900 may be based on user selection or guidance application definition (e.g., a display of only recorded and broadcast listings, only on-demand and broadcast listings, etc.). As illustrated, listings 914, 916, and 918 are shown as spanning the entire time block displayed in grid 902 to indicate that selection of these listings may provide access to a display dedicated to on-demand listings, recorded listings, or Internet listings, respectively. In some embodiments, listings for these content types may be included directly in grid 902. Additional media guidance data may be displayed in response to the user selecting one of the navigational icons 920. (Pressing an arrow key on a user input device may affect the display in a similar manner as selecting navigational icons 920.)

Display 900 may also include video region 922, and options region 926. Video region 922 may allow the user to view and/or preview programs that are currently available will be available, or were available to the user. The content of video region 922 may correspond to, or be independent of, one of the listings displayed in grid 902. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media device display screens of the embodiments described herein.

Options region 926 may allow the user to access different types of content, media device displays, and/or media device features. Options region 926 may be part of display 900 (and other display screens described herein) or may be invoked by a user by selecting an on-screen option or pressing a dedicated or assignable button on a user input device. The selectable options within options region 926 may concern features related to program listings in grid 902 or may include options available from the main menu display. Features related to program listings may include searching for other air times or ways of receiving a program, recording a program, enabling series recording of a program, setting program and/or channel as a favorite, purchasing a program, or other features. Options available from the main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media device may be personalized based on a user's preferences. A personalized media device allows a user to customize displays and features to create a personalized "experience" with the media device. This personalized experience may be created by allowing a user to input these customizations and/or by the media device monitoring user activity to determine various user preferences. Users may access their personalized guidance application by logging in or otherwise identifying themselves with the guidance application. Customization of the media device may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The set-top box, or other media device, may generate notifications to be transmitted to a user device based on one or more of the features and customizations of FIG. 9 as described above. For example, the user may be notified of content listings based on favorite channel selections. Thus, if an upcoming show is received from HBO, which is on the user favorite channel selection, then the notification may be modified based on the methods discussed here. However, if a notification is received from NBC for an upcoming show, that is not on a favorite channel selection, the notification may be modified or aggregated in a different way (e.g., modified with minimal information or not notified at all)

Figure 10:
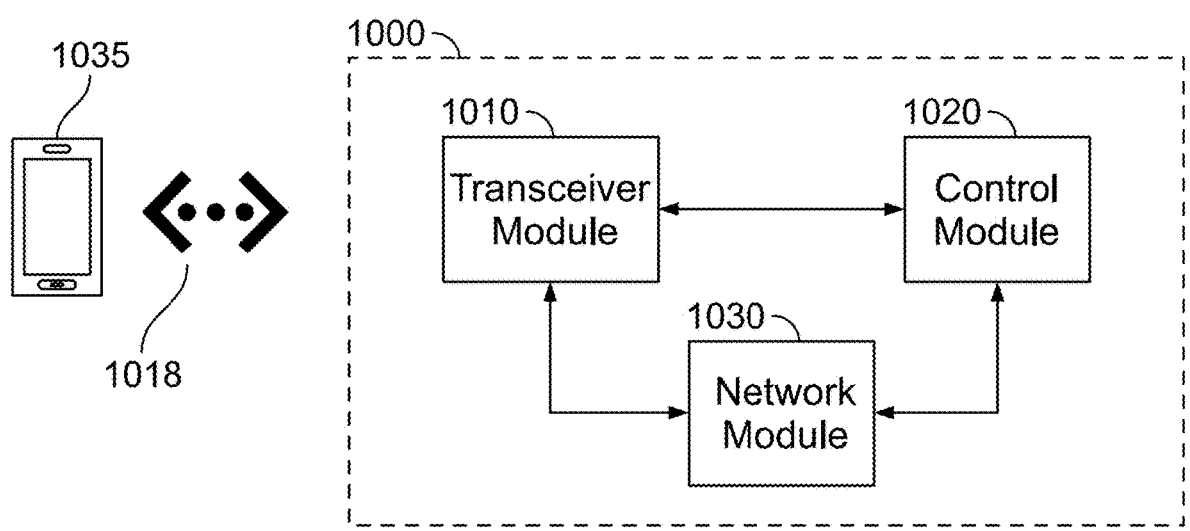
FIG. 10 illustrates an example media transmission device, in accordance with some embodiments of the disclosure.

FIG. 10 illustrates an exemplary media transmission device, in accordance with some embodiments of the disclosure. The media transmission system 1000 comprises a transceiver module 1010, a control module 1020, and a network module 1030. The media transmission system may communicate with an additional user device 1035, such as a home game way, smartphone, or other smart devices, and receive the notification from those other devices. In some examples, the transceiver module 1010 is configured to request, to receive, from at least one application on a user device, a notification. The notification may originate from a server such as server 1102, as described with reference to FIG. 11. The notification may originate from an application on the user device. In some examples, the network module 1030 may access a user profile.

In some examples, the control module 1020 is coupled to the transceiver module 1010 and the network module 1030. In some examples, the control module 1020 is adapted to identify temporal information associated with the notification and modify the temporal information associated with the notification to refer to a calendar-related event. For example, the control module may identify a date and time related to the notification and signal to the network module to access a user profile and/or to obtain calendar-related event information. Thereafter, the control module 1020 can modify the identified temporal information based on the calendar-related event in the user profile.

In some examples, the network module 1030 is coupled with the transceiver module. In some examples, the network module 1030 is configured to detect, based on the temporal information, a calendar-related event from a user profile. For example, the network module may be instructed by the control module or the transceiver module to access a user profile and to obtain calendar-related event information from the user profile at a time and or date associated with the temporal information.

In some examples, the transceiver module communicates with a second user device 1035 via communication link 1018. The communication link 1018 between the transceiver module 1010 and the second user device 1035 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the communication link 1018 is between the media transmission device 1000 and a home gateway device, which is in turn in communication with the second user device 1035. In some examples, the home gateway device may receive the notification and then transmit the notification to the second user device 1035. However, these examples are considered to be non-limiting and other combinations of the features herein being spread over two or more devices are considered within the scope of this disclosure. For example, each of the transceiver module, the network module, and the control module may be separate internet of things (IoT) devices that each carry out a portion of the methods herein. Collectively, these devices may be referred to as a system.

Figure 11:
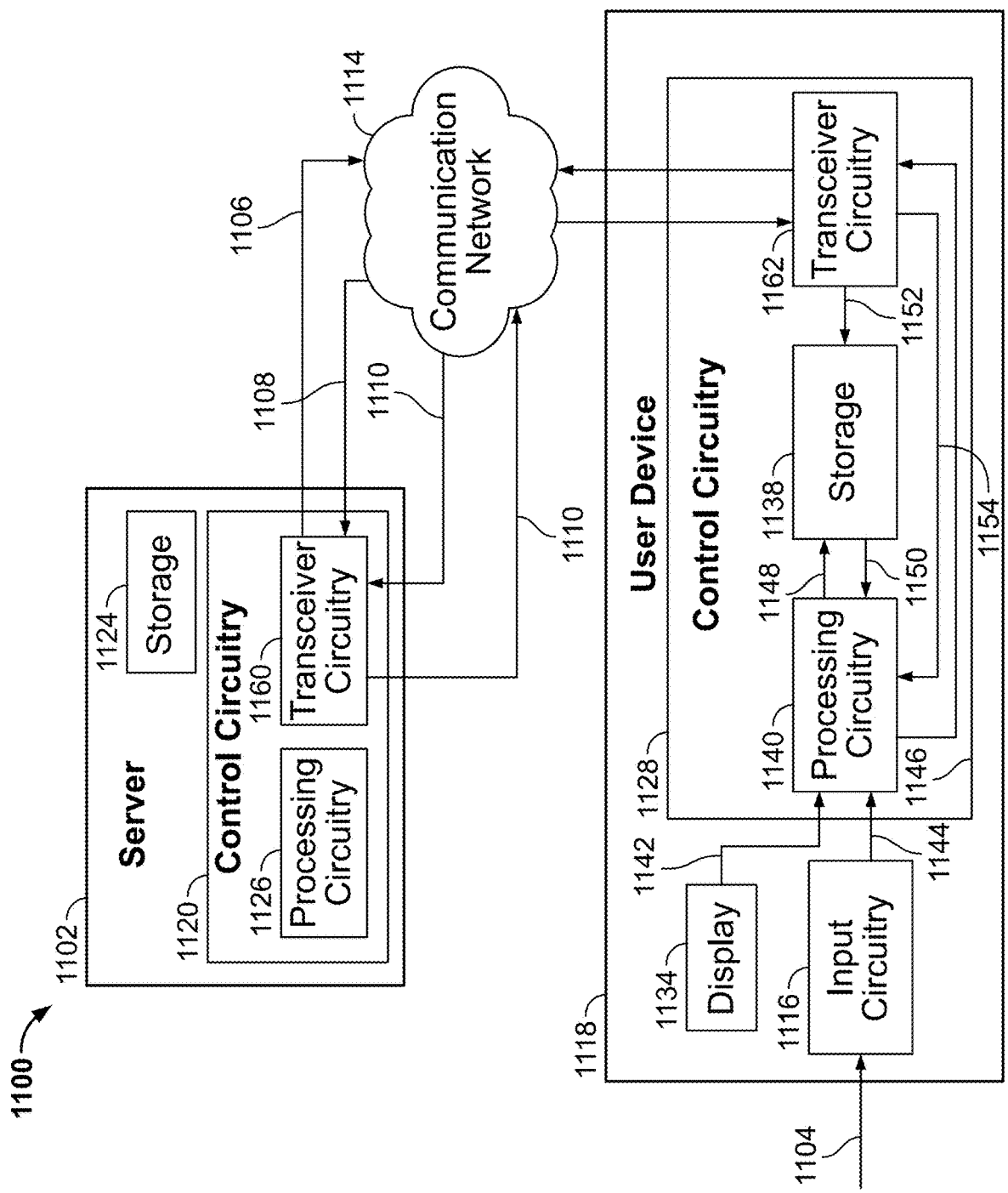
FIG. 11 is a block diagram representing devices, components of each device, and data flow therebetween for an adaptive video streaming system, in accordance with some embodiments of the disclosure.

FIG. 11 is a block diagram representing devices, components of each device, and data flow therebetween for an adaptive video streaming system, in accordance with some embodiments of the disclosure. System 1100 is shown to include a client device 1118, a server 1102, and a communication network 1114. It is understood that while a single instance of a component may be shown and described relative to FIG. 11, additional instances of the component may be employed. For example, server 1102 may include or may be incorporated in, more than one server. Similarly, communication network 1114 may include or may be incorporated in, more than one communication network. Server 1102 is shown communicatively coupled to client device 1118 through communication network 1114. While not shown in FIG. 11, server 1102 may be directly communicatively coupled to client device 1118, for example, in a system absent or bypassing communication network 1114.

In some examples, the notification is selectable and comprises information regarding the streaming of media content on a user device or a network device. For example, a user device or a network device (e.g., a laptop, PC, smartphone, smart TV, or the like) may be notified by a media server as a reminder to stream media content and, after the user interacts with the notification, the user may be able to consume media content on the user device, or schedule in a time to consume media content on the user device in the user's calendar. In some examples, the media content is an adaptive bitrate stream compatible with the MPEG-DASH standard, or other implementations such as Apple HLS. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1114 may comprise one or more network systems, such as, without limitation, an internet, LAN, WIFI, or other network systems suitable for audio processing applications. In some embodiments, system 1100 excludes server 1102, and functionality that would otherwise be implemented by server 1102 is instead implemented by other components of system 1100, such as one or more components of communication network 1114. In still other embodiments, server 1102 works in conjunction with one or more components of communication network 1114 to implement certain functionality described herein in a distributed or cooperative manner. Similarly, in some embodiments, system 1100 excludes client device 1118, and functionality that would otherwise be implemented by the client device 1118 is instead implemented by other components of system 1100, such as one or more components of communication network 1114 or server 1102 or a combination. In still other embodiments, the client device 1118 works in conjunction with one or more components of communication network 1114 or server 1102 to implement certain functionality described herein in a distributed or cooperative manner.

The client device 1118 includes control circuitry 1128, display 1134, and input-output circuitry 1116. Control circuitry 1128 in turn includes transceiver circuitry 1162, storage 1138, and processing circuitry 1140. In some embodiments, client device 1118 or control circuitry 1128 may be configured as user device 1135 of FIG. 11.

Server 1102 includes control circuitry 1120 and storage 1124. Each of the storages 1124 and 1138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1124, 1138 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 1124, 1138 or instead of storages 1124, 1138. In some embodiments, the pre-encoded or encoded media content, in accordance with the present disclosure, may be stored on one or more of storages 1124, 1138.

In some embodiments, control circuitry 1120 and/or 1128 executes instructions for an application stored on the memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored on storage 1124 and/or 1138 and executed by control circuitry 1120 and/or 1128. In some embodiments, the application may be a client/server application where only a client application resides on client device 1118, and a server application resides on server 1102.

The application may be implemented using any suitable architecture. For example, it may be a stand-alone application wholly implemented on client device 1118. In such an approach, instructions for the application are stored locally (e.g., in storage 1138), and data for use by the application is downloaded periodically (e.g., from an out-of-band feed, from an internet resource, or using another suitable approach). Control circuitry 1128 may retrieve instructions for the application from storage 1138 and process the instructions to perform the functionality described herein.

Based on the processed instructions, control circuitry 1128 may determine a type of action to perform in response to input received from the input/output path (or input-output circuitry) 1116 or the communication network 1114. For example, in response to a receiving a notification on the client device 1118, control circuitry 1128 may perform the steps of processes relative to various embodiments discussed herein.

In client/server-based embodiments, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Client device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on the client device 1118. Client device 1118 may receive inputs from the user via input circuitry 1116 and transmit those inputs to the remote server for processing and generating the corresponding displays. Alternatively, client device 1118 may receive inputs from the user via input circuitry 1116 and process and display the received inputs locally, by control circuitry 1128 and display 1134, respectively.

Server 1102 and client device 1118 may transmit and receive content and data such as media content via communication network 1114. For example, server 1102 may be a media content provider, and client device 1118 may be a smart television configured to download or stream media content, such as a YouTube video, from server 1102. Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuitry 1160, 1162, respectively, avoiding communication network 1114.

It is understood that client device 1118 is not limited to the embodiments and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1120 and/or control circuitry 1118 are configured to implement a media content operation system, such as systems, or parts thereof, that perform various media content manipulation processes described herein.

Client device 1118 receives a user input 1104 at input circuitry 1116. For example, client device 1118 may receive a user input like a user swipe or user touch, as previously discussed. In some embodiments, client device 1118 is a media device (or player), with the capability to access media content. It is understood that client device 1118 is not limited to the embodiments and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1104 may be received from a user selection-capturing interface that is separate from device 1118, such as a remote-control device, trackpad, or any other suitable user movement sensitive or capture devices, or as part of device 1118, such as a touchscreen of display 1134. Transmission of user input 1104 to client device 1118 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1116 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1140 may receive input 1104 from input circuit 1116. Processing circuitry 1140 may convert or translate the received user input 1104 that may be in the form of gestures or movement to digital signals. In some embodiments, input circuit 1116 performs the translation to digital signals. In some embodiments, processing circuitry 1140 (or processing circuitry 1126, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for modifying a notification, the method comprising:
    receiving, from at least one application on a user device, a notification for a first event from a calendar;
    identifying temporal information for the first event described by the notification;
    detecting, based on the temporal information, a second event from the calendar;
    determining a free time slot in the calendar, wherein the free time slot is adjacent to the second event from the calendar and corresponds to the temporal information for the first event; and
    modifying the temporal information for the first event described by the notification to include information describing the second event from the calendar and the free time slot in the calendar.

2. The method of claim 1, wherein the calendar corresponds to a user profile, the method further comprising:
    determining a user preference from the user profile;
    modifying the temporal information described by the notification based on the user preference.

3. The method of claim 2, further comprising:
    wherein the user preference comprises a threshold time;
    wherein the modifying the temporal information described by the notification is in response to the temporal information associated with the notification being less than the threshold time.

4. The method of claim 1, further comprising:
    removing references to temporal information from the notification.

5. The method of claim 1, wherein the calendar corresponds to a user profile, the method further comprising:
    determining user-preferred vocabulary from the user profile; and
    modifying the calendar-related event with the user preferred vocabulary.

6. The method of claim 1, wherein the calendar corresponds to a user profile, the method further comprising:
    determining, from the user profile, the calendar-related event is one of: a birthday, an anniversary, a holiday event, a national holiday, a bank holiday, a religious event, an historical event, a user-saved date of interest; and
    determining a context of the calendar-related event.

7. The method of claim 1, further comprising:
    identifying an insertion point within a time threshold of the calendar-related event;
    receiving a user input to create a calendar event; and
    inserting the calendar event at the insertion point.

8. A media device, comprising a control module, a transceiver module, and a network module, configured to:
    receive, from at least one application on a user device, a notification for a first event from a calendar;
    identify temporal information described by the notification;
    detect, based on the temporal information, a second event from the calendar;
    determine a free time slot in the calendar, wherein the free time slot is adjacent to the second event from the calendar and corresponds to the temporal information for the first event; and
    modify the temporal information for the first event described by the notification to include information describing the second event from the calendar and the free time slot in the calendar.

9. The media device of claim 8, wherein the calendar corresponds to a user profile, and wherein the media device is further configured to:
    determine a user preference from the user profile;
    modify the temporal information described by the notification based on the user preference.

10. The media device of claim 9, further configured to:
    wherein the user preference comprises a threshold time;
    wherein the modifying the temporal information described by the notification is in response to the temporal information described by the notification being less than the threshold time.

11. The media device of claim 8, further configured to:
    remove references to temporal information from the notification.

12. The media device of claim 8, wherein the calendar corresponds to a user profile, and wherein the media device is further configured to:
    determine user-preferred vocabulary from the user profile;
    modify the calendar-related event with the user preferred vocabulary.

13. The media device of claim 8, wherein the calendar corresponds to a user profile, and wherein the media device is further configured to:
    determine, from the user profile, the calendar-related event is one of: a birthday, an anniversary, a holiday event, a national holiday, a bank holiday, a religious event, an historical event, a user-saved date of interest;
    determine a context of the calendar-related event.

14. The media device of claim 8, further configured to:
    identify an insertion point within a time threshold of the calendar-related event;
    receive a user input to create a calendar event; and
    insert the calendar event at the insertion point.

* * * * *